United States Patent
Pugaczewski

(10) Patent No.: US 6,643,266 B1
(45) Date of Patent: Nov. 4, 2003

(54) METHOD FOR QUALIFYING A LOOP FOR DSL SERVICE

(75) Inventor: John T. Pugaczewski, White Bear Lake, MN (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/448,669

(22) Filed: Nov. 24, 1999

Related U.S. Application Data

(60) Provisional application No. 60/114,426, filed on Dec. 31, 1998.

(51) Int. Cl.$^7$ .................................................. H04M 1/24
(52) U.S. Cl. ...................... 370/249; 370/252; 379/1.04; 379/22.01
(58) Field of Search ................................ 370/241, 248, 370/250, 252, 522, 524, 249; 379/1.04, 22.01, 27.03, 30

(56) References Cited

U.S. PATENT DOCUMENTS

| | | | |
|---|---|---|---|
| 4,791,659 A | | 12/1988 | Ross |
| 4,870,675 A | * | 9/1989 | Fuller et al. ............. 379/29.05 |
| 4,989,202 A | * | 1/1991 | Soto et al. .................. 370/244 |
| 5,166,925 A | | 11/1992 | Ward |
| 5,559,854 A | | 9/1996 | Suzuki |
| 5,784,558 A | | 7/1998 | Emerson et al. |
| 5,793,751 A | | 8/1998 | Baker et al. |
| 5,883,883 A | | 3/1999 | Baker et al. |
| 5,892,756 A | | 4/1999 | Murphy |
| 5,909,445 A | | 6/1999 | Schneider |
| 5,917,885 A | * | 6/1999 | Berken et al. ............. 379/22.02 |
| 5,991,270 A | | 11/1999 | Zwan et al. |
| 6,002,671 A | | 12/1999 | Kahkoska et al. |
| 6,014,369 A | * | 1/2000 | Takahasahi .................. 370/248 |
| 6,014,425 A | | 1/2000 | Bingel et al. |
| 6,058,162 A | | 5/2000 | Nelson et al. |
| 6,091,713 A | | 7/2000 | Lechleider et al. |
| 6,185,191 B1 | * | 2/2001 | Dipperstein .................. 370/249 |
| 6,292,539 B1 | * | 9/2001 | Eichen et al. .............. 379/1.04 |
| 6,385,297 B2 | * | 5/2002 | Faulkner et al. ........... 379/1.04 |

OTHER PUBLICATIONS

U.S. patent application Ser. No. 09/435,500, David A. Manica et al., filed, Nov. 6, 1999.
U.S. patent application Ser. No. 09/435,954, David M. Sanderson, filed Nov. 9, 1999.
International Search Report—Apr. 18, 2000.
International Search Report—Apr. 26, 2000.
International Search Report—Mar. 15, 2000.

\* cited by examiner

Primary Examiner—Min Jung
(74) Attorney, Agent, or Firm—Brooks Kushman P.C.

(57) ABSTRACT

A method for qualifying a local loop for digital subscriber line service includes transmitting signals from a customer modem and receiving corresponding reflected signals. The loop qualification test is initiated at the customer side, with the test result for the loop qualification test being based on reflected signals that correspond to signals transmitted over the loop from the modem.

17 Claims, 2 Drawing Sheets

METHOD FOR QUALIFYING A LOOP FOR DSL SERVICE

CROSS-REFERENCE TO RELATED APPLICATIONS

This application claims the benefit of U.S. Provisional Application No. 60/114,426, filed on Dec. 31, 1998 and entitled "Loop Qualification Tool."

TECHNICAL FIELD

The present invention relates to a method for qualifying a local loop for digital subscriber line (DSL) service.

BACKGROUND ART xDSL is a generic term for digital subscriber line equipment and services, including packet-based architectures, such as ADSL, HDSL, SDSL, VDSL, and RADSL. That is, x is the generic. DSL technologies provide extremely high bandwidth over embedded twisted pair, copper cable plant. DSL technologies offer great potential for bandwidth-intensive applications, such as Internet access, remote LAN access, video conferencing, and video-on-demand.

ADSL or asymmetric digital subscriber line services generally use existing unshielded twisted pair (UTP) copper wires from the telephone company's central office to the subscriber's premise, utilize electronic equipment in the form of ADSL modems at both the central office and the subscriber's premise, send high-speed digital signals up and down those copper wires, and send more information one way than the other. The ADSL flavor of DSL services is capable of providing a downstream bandwidth of about 1.5 Mbps–6.144 Mbps, and an upstream bandwidth of about 32 Kbps–640 Kbps with loop distances ranging from about 3.7 km–5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive digital subscriber line services. RADSL provides a dynamic connection that adapts to the length and quality of the line.

In the DSL family of services, many DSL themes, including ADSL, HDSL, SDSL, VDSL, and RADSL, utilize a packet-based approach that does away with the line-grabbing practice of circuit switched networks, such as ISDN (although ISDN service is a form of digital subscriber line). This packet-based approach is very advantageous in a variety of situations, such as high-speed data services, including high definition television or HDTV transmissions.

Of course, DSL services, also commonly referred to as simply DSL or digital subscriber line services, are much more dependent on line conditions than traditional telephone services. Traditional telephone services typically use a bandwidth including frequencies up to about 3 kilohertz, while the DSL services utilize a bandwidth including frequencies up into the hundreds of kilohertz. While some local loops are in great condition for implementing DSL services, that is, the local loops have short to moderate lengths with minimal bridged taps and splices, many local loops are not as clean. For example, local loop length vary widely, for example, from as short as a few hundred meters to as long as several kilometers.

Further, sometimes the wire gauge for a local loop is not continuous over the length of the loop. That is, a portion of the local loop may be one wire gauge, while an adjacent portion of the local loop has a different wire gauge, with the two portions being spliced together. Still further, many existing local loops have one or more bridged taps. A bridged tap is a length of wire pair that is connected to a loop at one end and is unterminated at the other end. Sometimes, an existing local loop will have several bridged taps so that the telephone company may connect a customer to any one of the taps (while leaving the other taps unterminated). Tapped lines may allow the telephone company to better utilize its copper cable plant distribution. For example, a particular service area may include 25 residences. Because not all residences require multiple phone lines, there may be a total of about 30 or 35 local loops, with some of the loops having multiple bridged taps. As such, it may be possible for any one of the residences to order multiple line service, so long as only a few of the residences do so.

Because so many different factors affect the success of a DSL solution, the question of whether or not a particular local loop qualifies for any level of DSL service is a complicated one. Due to varying line conditions, some loops may qualify for the highest quality DSL service, while other loops only qualify for a very limited bandwidth, and still, some of the loops do not qualify at all for DSL service. The steps involved in determining the quality of DSL service that is available on a particular loop is called the loop qualification process. In an existing loop qualification process, a customer calls a DSL service provider and inquires as to the availability of DSL service. The customer service representative then performs a database look-up on the customer's line and evaluates the ability to receive DSL service. If the customer service representative believes that further inquiry is required, he/she may test the circuit with voice band measurement devices.

Unfortunately, the accuracy of some database records is questionable, and voice band measurements do not always accurately reflect the ability of a loop to support DSL services. As such, many times the customer cannot know the actual available bandwidth for DSL services until after customer premise equipment has been purchased and installed at the customer residence. If, after several steps have been taken to implement a DSL solution, it is then determined that the local loop is in such poor condition that DSL cannot be supported or that the local loop does not support as much bandwidth as the customer anticipated, there can be a lot of disappointment for both the customer and the service provider.

For the foregoing reasons, there is a need for a method that allows a customer to determine whether or not a local loop is capable of receiving DSL service that overcomes the limitations associated with the prior art.

DISCLOSURE OF INVENTION

It is, therefore, an object of the present invention to provide a method for qualifying a local loop for digital subscriber line service that transmits a test signal from the customer end of the loop and measures the reflected signals to qualify the loop.

In carrying out the above object, a method for qualifying a local loop for digital subscriber line service is provided. The loop has a provider end at a local switch and a customer end with a computer connected to the customer end. The computer includes a modem providing the connection to the loop. The method comprises initiating a loop qualification test at the computer. The method further comprises communicating with the modem to transmit a set of signals over the loop, and communicating with the modem to receive a set of reflected signals. The reflected signals correspond to the transmitted signals as reflected at the local switch. Further, a test result is determined for the loop qualification test based on the set of reflected signals.

Preferably, the computer executes software including a modem device driver. Communicating with the modem to transmit and to receive are performed with the modem device driver. In some embodiments, determining the test result further comprises determining a signal to noise ratio for a reflected signal of the set of reflected signals. In some embodiments, determining the test result further comprises determining a return loss for a reflected signal of the set of reflected signals. As appropriate, a substantially matching impedance may be provided at the modem to reduce the modem reflection coefficient. In some embodiments, initiating the loop qualification test at the computer further comprises executing a miniprogram on the computer. The miniprogram, in some embodiments, is in a browser executable format.

Further, in carrying out the present invention, a method for qualifying a local loop for digital subscriber line service is provided. The loop has a provider end and a customer end with a computer connected to the customer end. The computer includes a modem providing the connection to the loop. The method comprises establishing a connection to a test server with the modem, and downloading a computer program from the test server. The method further comprises executing the computer program to initiate a loop qualification test at the computer. The computer program directs the computer to terminate the server connection, and transmit a set of signals over the loop. The computer program further directs the computer to receive a set of reflected signals corresponding to the transmitted signals, and to determine a test result for the loop qualification test based on the set of reflected signals.

Preferably, the computer program further directs the computer to re-establish a connection to the test server, and to send the test result to the test server. The test server interprets the test result and reports the interpreted result. In some embodiments, determining the test result further comprises determining a signal to noise ratio for a reflected signal of the set of reflected signals. In some embodiments, determining the test result further comprises determining a return loss for a reflected signal of the set of reflected signals. In some embodiments, a substantially matching impedance is provided at the modem to reduce the reflection coefficient at the modem. In some embodiments, the computer program has a browser executable format such as JAVA or ACTIVEX. In other embodiments, the computer program may be an operating system executable file.

Still further, in carrying out the present invention, a computer readable storage medium is provided. The computer readable storage medium includes instructions represented by information stored on the medium. The instructions are executable to perform a method for qualifying a local loop for digital subscriber line service. The loop has a provider end at a local switch and a customer end with a computer connected to the customer end. The computer includes a modem providing the connection to the loop. The computer readable storage medium further comprises instructions for initiating a loop qualification test at the computer, instructions for communicating with the modem to transmit a set of signals over the loop, and instructions for communicating with the modem to receive a set of reflected signals. The reflected signals correspond to the transmitted signals as reflected at the local switch. The computer readable storage medium further comprises instructions for determining a test result for the loop qualification test based on the set of reflected signals.

In some embodiments, the instructions are in a browser executable format. In some embodiments, the instructions are in a virtual machine executable format. In some embodiments, the instructions are in an operating system executable format.

The advantages associated with embodiments of the present invention are numerous. For example, embodiments of the present invention perform a loop qualification initiated by the customer side. Advantageously, embodiments of the present invention may be achieved using a 56 kbps modem (having the appropriate transmitting and receiving capabilities) or DSL modem having appropriate hardware capabilities and an appropriate device driver. In accordance with the present invention, the customer may initiate a loop qualification test and obtain a test result for the local loop. Depending upon the local loop and the termination in the central office, the measure of returned frequency and decibel (dB) value would help determine the line's ability to support DSL service. It is appreciated that embodiments of the present invention may take the form of a computer program. In some implementations, the computer program may be a miniprogram such as a JAVA applet or ACTIVEX program that may be downloaded over the Internet and then executed at the customer side. In the alternative, the computer program may be a stand-alone executable, possibly distributed on CD ROM.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
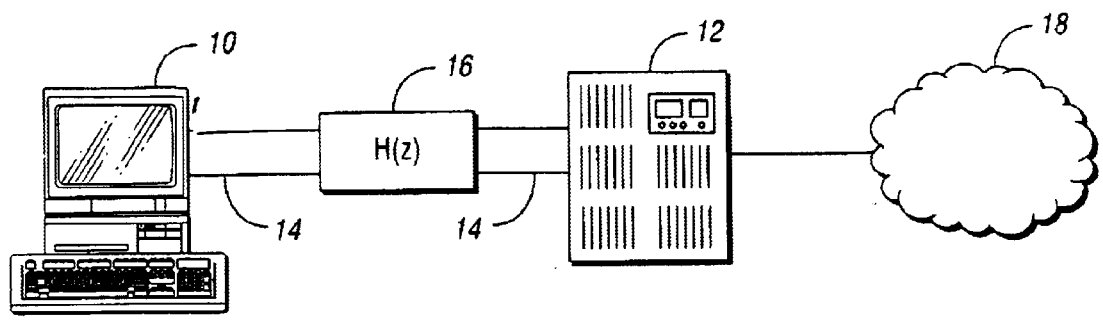
FIG. 1 illustrates a test system diagram in accordance with the present invention.

Referring to FIG. 1, a computer 10 is located at the customer site. An exchange 12 provides a plurality of local loops to a geographic area. Computer 10 and exchange 12 are connected by local loop 14. That is, local loop 14 is the phone line that runs into the customer's site. As such, in addition to computer 10, numerous phones may be connected to loop 14. Various conditions along loop 14, including loop length, may affect the transfer function 16 of loop 14. Embodiments of the present invention initiate loop qualification tests from computer 10 to determine if loop 14 qualifies for DSL service. Exchange 12 connects to network 18 to allow calls from computer 10 (or other telephony devices at the customer site) to reach destinations not directly connected to exchange 12.

Figure 2:
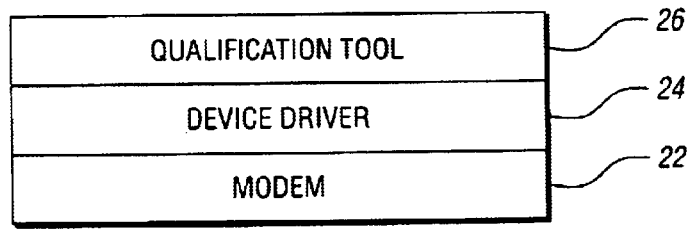
FIG. 2 depicts a protocol stack for the loop qualification tool of the present invention.

Embodiments of the present invention utilize a modem within the customer computer to perform testing and measuring of the local loop. As best shown in FIG. 2, a protocol stack for the loop qualification tool of the present invention is generally indicated at 20. Qualification tool 26, suitably implemented as a computer program or miniprogram, uses a device driver 24 to access modem 22. Device driver 24 is usually implemented as software that runs within an operating system on the computer. Modem 22 is preferably a hardware modem, but a software modem may be used in some testing situations, as appropriate. In accordance with the present invention, loop qualification tool 26 accesses modem 22 via device driver 24. Access to the modem may be via an application programming interface (API) to modem 22, allowing access to measurement functions of the modem. The measurement functions of the modem should include the ability to generate various tones (or frequencies) at specified decibel (dB) levels. An appropriate device driver allows an application, such as a program or miniprogram, to be written that could perform testing and measuring with the modem. Of course, it is appreciated that device driver 24 may need to be specifically written for use with loop qualification tool 26, and that the normal device driver (normally used by the operating system) may not always provide access to the appropriate testing and measurement functions of the modem.

Device driver 24 would allow an application to perform testing that includes taking measurements such as, for example, signal to noise ratio, return loss, or frequency scanning. It may be desirable to configure the modem such that the modem may provide matching impedance on the customer end of the loop when injecting a set of frequencies into the network. Depending upon the local loop and termination in the central office, the measured return frequency and decibel (dB) value may be used to determine the line's ability to provide DSL service.

With continuing reference to FIG. 1, the transfer function, H(z) is a mathematical representation of the local loop electrical characteristics. The transfer function represents the combined reactance of the line as seen by exchange 12 and personal computer 10. The response to injected signals as seen by the receiving end either through reflection or transmission is generally a function of frequency. When making measurements from the modem, electrical characteristics of exchange 12 should also be considered.

In accordance with the present invention, it is appreciated that a loop quality test is initiated at the customer side. Some embodiments may make various approximations about the local loop, while using measurements from the modem to form an overall test result indicating loop quality. For example, sometimes, loop resistance may be approximated as 1.5 kohms. The resistance, capacitance, and the inductance at the modem, over the loop, and at the exchange, must all be taken into consideration because the reactance is the function of the frequency. While the resistance is constant over frequency, both the capacitance and the inductance will vary, therefore, so will the total reactance.

In accordance with the present invention, a sufficiently defined loop model combined with a modem capable of generating and measuring the necessary random frequencies, and combined with a device driver that has access to the needed modem functions, allows a customer side initiated loop qualification test to determine line quality and DSL support capability.

The device driver 24 is the important piece of software that provides access to the functions of modem 22. With a sufficient device driver, a software qualification tool should specify the electrical criteria for testing. Specifically, a set of transmission frequencies and transmission levels are selected for transmission, and reflected signals are measured. The set of transmitted and measured frequencies at various levels, along with the estimated mathematical representation of the transfer function of the local loop, are used to calculate whether the loop is qualified for DSL services.

Figure 3A:
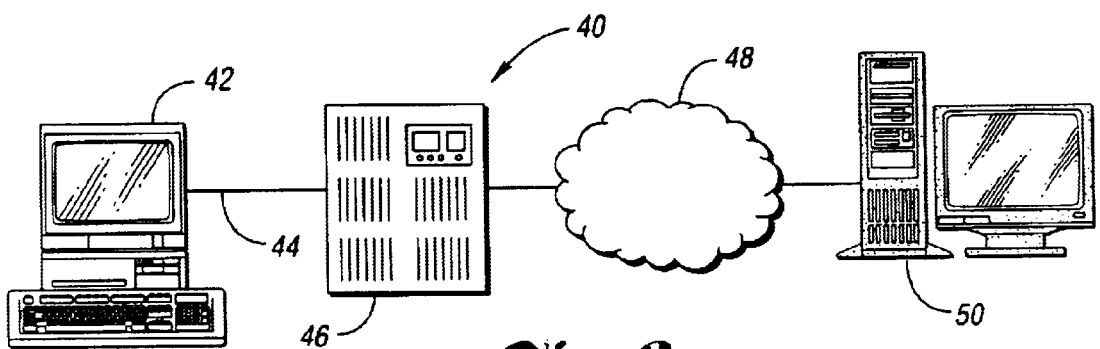
FIGS. 3a and 3b illustrate an application diagram.
Figure 3B:
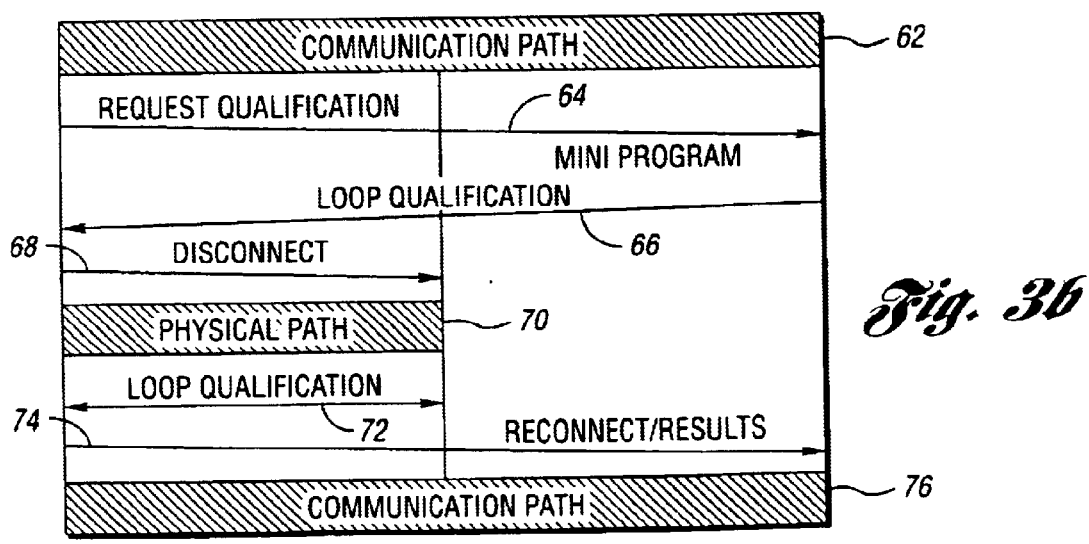

With reference to FIGS. 3a and 3b, a suitable implementation of the present invention is illustrated. That is, in accordance with the present invention, measuring and testing functions of a modem are used by a loop qualification software tool to initiate a customer side line quality test. The particular implementation of the qualification tool may take many forms, with a suitable implementation illustrated herein. As generally indicated at 40, computer 42 connects by line 44 to exchange 46. Exchange 46 is in communication with network 48, to allow communication with server 50.

In this implementation of the present invention, the loop qualification tool is a software miniprogram that is downloaded and executed to test the line quality. Of course, other implementations are contemplated. At 62, the customer establishes a communication path between computer 42 and server 50. A loop qualification test is requested at 64, and the loop qualification miniprogram is downloaded at 66. Upon execution of the miniprogram, the connection to server 50 is terminated, leaving physical path 70 between computer 42 and exchange 46. Loop qualification, as indicated at 70, is performed by transmitting signals from the modem within computer 42 and measuring the reflections of those signals as reflections return to the modem. After the measurements are taken, the communication path 76 is re-established to server 50. The measurements are sent to server 50, and server 50 interprets and presents the results of the qualification test.

Of course, the above example is a suitable implementation of the present invention, but many variations are possible. For example, the loop qualification software need not be downloaded from server 50 but may be obtained in other ways. Further, the software may be in any number of forms such as a program or a miniprogram (browser executable), and so on. Still further, the measurement results may be interpreted at computer 42 rather than sent to server 50 (at 74). And, of course, many other variations may be made to the exemplary test arrangement described above.

Figure 4:
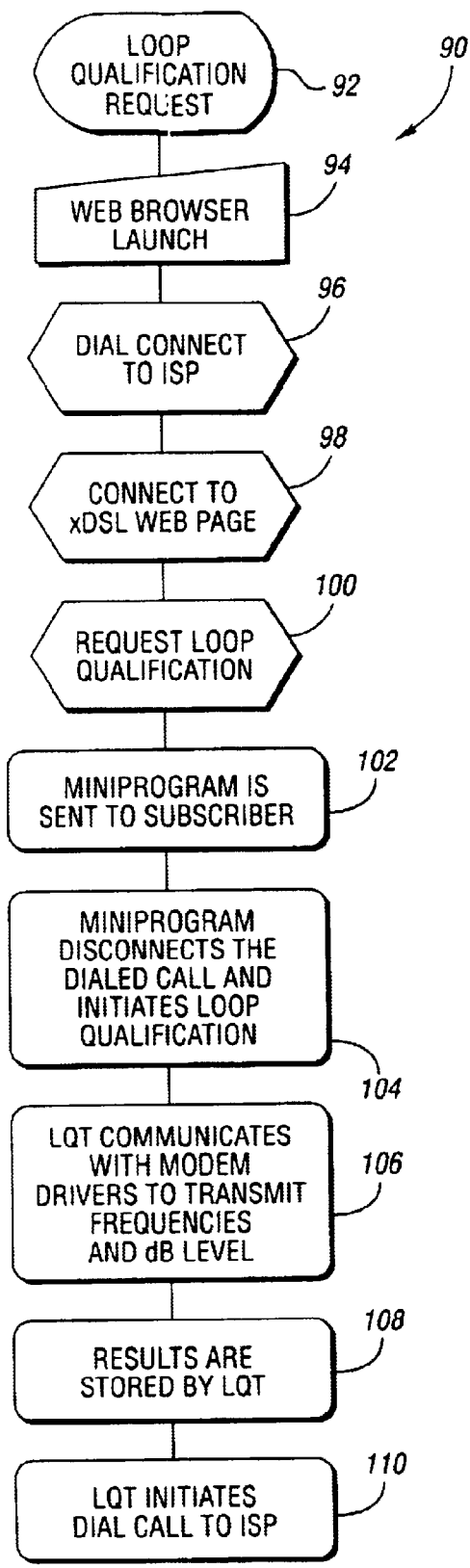
FIG. 4 is a block diagram illustrating a loop qualification process in accordance with the present invention.

The process flow for the example in FIGS. 3a and 3b is best shown in FIG. 4. In FIG. 4, a process flow diagram is generally indicated at 90. The loop qualification request occurs at display block 92. The web browser is launched at manual input block 94. Of course, launch may be automatic. If the computer does not have all software (program or miniprogram, device driver, etc.) to perform loop qualification tests, a connection is made to an Internet service provider at data transmission block 96. At block 98, the subscriber is connected to a DSL test webpage. At block 100, the computer requests to download any needed software. At event block 102, software is downloaded to the customer computer (client computer).

At block 104, the call is disconnected so that signals may be reflected from the exchange back to the computer for measurement. At block 106, the loop qualification tool software communicates with the modem drivers to transmit specific frequencies at specific decibel levels.

At block 108, reflections are measured and noted by the loop qualification tool software. At block 110, as needed, the loop qualification tool initiates a call to the Internet service provider to reestablish a connection to the loop qualification tool server and reports results, allowing the server to interpret those results for the customer. The server may base an overall qualification result on the test results in addition to any other information available to the server.

A suitable implementation for the present invention is as a loop qualification tool developed with a web browser interface, activated using a miniprogram (for example, a JAVA application or ACTIVEX application). In the example, the loop qualification test could be initiated by the customer using a 56 k modem for a dial-up connection to their ISP. The miniprogram, upon execution would terminate the connection, test the line, store the results, and reconnect and report the results. Because the software needs to access the modem device driver, issues such as JAVA security and the JAVA sandbox should be examined. As such, a JAVA implementation may have to walk the customer through a manual test. On the other hand, ACTIVEX will allow access to such device level mechanisms as the modem, and may be written as a fully automated test.

Figure 5:
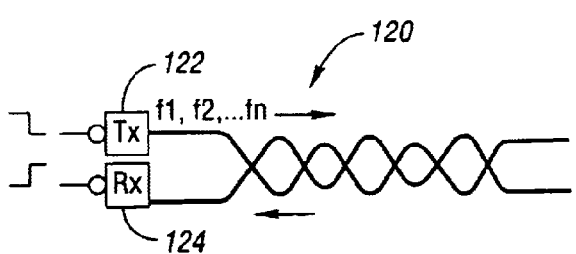
FIG. 5 shows the physical transmit and receive wires of the local loop.
Figure 6A:
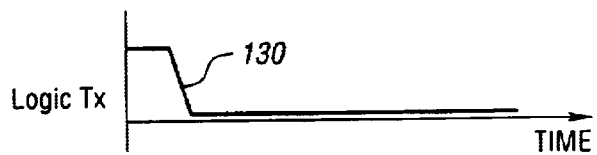
FIGS. 6a and 6b illustrate the logic transmit and logic receive signals.
Figure 6B:
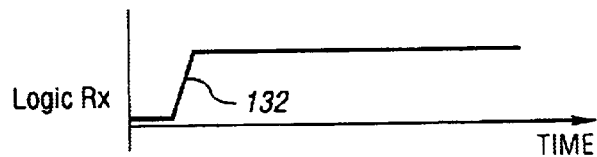
Figure 6C:
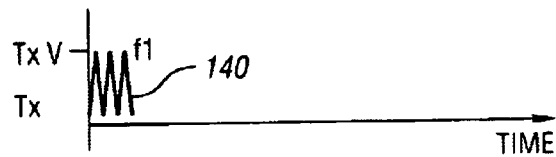
FIGS. 6c and 6d illustrate the physical transmit and physical receive signals corresponding to the logic signals of FIGS. 6a and 6b, respectively.
Figure 6D:
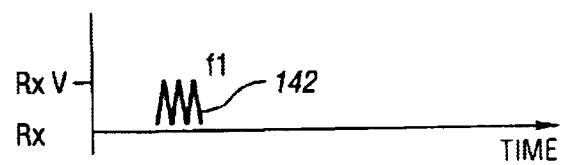

In FIG. 5, a local loop pair is generally indicated at 120. As shown, frequencies are injected into wires 122 and 124, with reflections being received at the same physical wires 122 and 124. FIGS. 6a and 6b show the logical transmit signal 130 and the logical receive signal 132 during a test. FIGS. 6c and 6d show the physical signals. The transmit signal 140 is reflected at the exchange, with the reflected signal 142 being measured by the modem and used as a basis for determining DSL qualification. The transmitter is disabled after transmission to allow measurement of the reflection because the signals are differential signals.

It is to be appreciated that embodiments of the present invention initiate DSL qualification testing from the customer side. Advantageously, a modem and a computer may be used for measuring and testing to determine DSL qualification. The software tool that accesses the modem via the device driver could be in any of a number of different forms, such as a miniprogram that is distributed over the Internet, or a larger program that may be distributed on complimentary compact disks.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for qualifying a local loop for digital subscriber line service, the loop having a provider end at a local switch and a customer end with a computer connected to the customer end, the computer including a modem providing the connection to the loop, the method comprising:

initiating a loop qualification test at the computer;
   communicating with the modem to transmit a set of signals over the loop;
   communicating with the modem to receive a set of reflected signals corresponding to the transmitted signals as reflected at the local switch; and
   determining a test result for the loop qualification test based on the set of reflected signals.

2. The method of claim 1 wherein the computer executes software including a modem device driver and wherein communicating with the modem to transmit and communicating with the modem to receive are performed with the modem device driver.

3. The method of claim 1 wherein determining the test result further comprises
   determining a signal to noise ratio for a reflected signal of the set of reflected signals.

4. The method of claim 1 wherein determining the test result further comprises:
   determining a return loss for a reflected signal of the set of reflected signals.

5. The method of claim 1 further comprising:
   providing a substantially matching impedance at the modem.

6. The method of claim 1 wherein initiating further comprises:
   executing a miniprogram on the computer.

7. The method of claim 6 wherein the miniprogram is in a browser executable format.

8. A method for qualifying a local loop for digital subscriber line service, the loop having a provider end at a local switch and a customer end with a computer connected to the customer end, the computer including a modem providing the connection to the loop, the method comprising:

establishing a connection to a test server with the modem;
   downloading a computer program from the test server; and
   executing the computer program to initiate a loop qualification test at the computer, the computer program directing the computer to terminate the test server connection, transmit a set of signals over the loop, receive a set of reflected signals corresponding to the transmitted signals as reflected from the local switch, and determine a test result for the loop qualification test based on the set of reflected signals.

9. The method of claim 8 wherein the computer program further directs the computer to re-establish a connection to the test server, and to send the test result to the test server, wherein the test server interprets the test result and reports the interpreted result.

10. The method of claim 9 wherein determining the test result further comprises:
    determining a signal to noise ratio for a reflected signal of the set of reflected signals.

11. The method of claim 9 wherein determining the test result further comprises:
    determining a return loss for a reflected signal of the set of reflected signals.

12. The method of claim 9 further comprising:
    providing a substantially matching impedance at the modem.

13. The method of claim 9 wherein the computer program has a browser executable format.

14. A computer readable storage medium including instructions represented by information stored on the medium, the instructions being executable to perform a method for qualifying a local loop for digital subscriber line service, the loop having a provider end at a local switch and a customer end with a computer connected to the customer end, the computer including a modem providing the connection to the loop, the computer readable storage medium further comprising:

instructions for initiating a loop qualification test at the computer;

instructions for communicating with the modem to transmit a set of signals over the loop;

instructions for communicating with the modem to receive a set of reflected signals corresponding to the transmitted signals as reflected at the local switch; and instructions for determining a test result for the loop qualification test based on the set of reflected signals.

15. The computer readable storage medium of claim 14 wherein the instructions are in a browser executable format.

16. The computer readable storage medium of claim 14 wherein the instructions are in a virtual machine executable format.

17. The computer readable storage medium of claim 14 wherein the instructions are in an operating system executable format.

* * * * *